(12) United States Patent
Oda et al.

(10) Patent No.: US 7,360,530 B2
(45) Date of Patent: Apr. 22, 2008

(54) AIR CLEANER

(75) Inventors: Kouichi Oda, Aichi-ken (JP); Koushin Wakayama, Aichi-ken (JP)

(73) Assignee: Toyota Boshoku Kabushiki Kaisha, Aichi-Ken (JP)

( * ) Notice: Subject to any disclaimer, the term of this patent is extended or adjusted under 35 U.S.C. 154(b) by 0 days.

(21) Appl. No.: 11/423,274

(22) Filed: Jun. 9, 2006

(65) Prior Publication Data

US 2006/0283426 A1 Dec. 21, 2006

(30) Foreign Application Priority Data

Jun. 15, 2005 (JP) .............................. 2005-175465

(51) Int. Cl.
*F02M 33/02* (2006.01)
*B01D 39/00* (2006.01)

(52) U.S. Cl. .................... 123/518; 55/497; 55/511; 55/490; 96/134; 123/198 E

(58) Field of Classification Search ............. 123/518, 123/198 E; 55/497, 490, 495, 511; 96/134
See application file for complete search history.

(56) References Cited

U.S. PATENT DOCUMENTS

| 4,418,662 A | * | 12/1983 | Engler et al. | ............ | 96/133 |
| 6,165,240 A | * | 12/2000 | Hodge | ............ | 55/497 |
| 6,383,268 B2 | * | 5/2002 | Oda | ............ | 96/134 |
| 6,387,143 B1 | * | 5/2002 | Adiletta | ............ | 55/497 |
| 6,592,655 B2 | * | 7/2003 | Iriyama et al. | ............ | 96/138 |

FOREIGN PATENT DOCUMENTS

| JP | 2002-266713 | 9/2002 |
| JP | 2002-276486 | 9/2002 |
| JP | 2003-042017 | 2/2003 |

* cited by examiner

*Primary Examiner*—Stephen K. Cronin
*Assistant Examiner*—J. Page Hufty
(74) *Attorney, Agent, or Firm*—Caesar, Rivise, Bernstein, Cohen & Pokotilow, Ltd.

(57) ABSTRACT

A housing 11 accommodates a pleated filter element 14. A fuel adsorbent member 16 is arranged in the housing 11 at a position downstream from the filter element 14. The fuel adsorbent member 16 adsorbs evaporative fuel leaking from an engine. The fuel adsorbent member 16 includes holding pleats 16g. Each of the holding pleats 16g is received in the space between an adjacent pair of the element pleats 14a of the filter element 14. This maintains the interval between the element pleats 14a. The holding pleats 16g are formed by folding the fuel adsorbent member 16.

7 Claims, 4 Drawing Sheets

AIR CLEANER

BACKGROUND OF THE INVENTION

The present invention relates to a fuel adsorbent member that adsorbs evaporative fuel leaking from an engine intake system and an air cleaner including the fuel adsorbent member.

Japanese Laid-Open Patent Publication Nos. 2002-266713 and 2002-276486, for example, describe typical fuel adsorbent members and air cleaners. In the devices described in these documents, a filter element, which filters intake air, is arranged in a housing in a pleated state. A fuel adsorbent member is provided in the housing at a position downstream from the filter element for adsorbing evaporative fuel leaking from an intake system of an engine. The filter element and the fuel adsorbent member are each arranged in a manner crossing an air passage defined in the air cleaner.

Particularly, the device described in Japanese Laid-Open Patent Publication No. 2002-276486 includes a heat-resistant net provided in the fuel adsorbent member. If the engine backfires, the net blocks a flame caused by the engine backfire to prevent damages to the fuel adsorbent member and the filter element.

However, in each of the devices described in Japanese Laid-Open Patent Publication Nos. 2002-266713 and 2002-276486, pressure caused by the engine backfire acts to press the fuel adsorbent member against the filter element. This may damage a securing portion of the fuel adsorbent member by which the fuel adsorbent member is secured to the housing. Although the heat-resistant net of Japanese Laid-Open Patent Publication No. 2002-276486 blocks a flame produced by the engine backfire, the net cannot block the pressure caused by the backfire.

Further, in conventional devices, a filter element is arranged in a pleated state and extends in such a manner as to cross the air passage. Thus, as indicated by the double-dotted broken lines of FIG. 7, intake air expands a downstream section of each element pleat 34a of a filter element 34. This may bring each adjacent pair of the element pleats 34a into tight contact with each other. This reduces the air-permeability of the filter element 34, thus significantly lowering dust catching performance of the filter element 34.

SUMMARY OF THE INVENTION

Accordingly, it is an objective of the present invention to provide a fuel adsorbent member and an air cleaner that maintain dust catching performance of a filter element by holding each of element pleats of the filter element separately from an adjacent element pleat, and prevent damages to a securing portion of the fuel adsorbent member in the case of a backfire of an engine.

To achieve the foregoing objectives, one aspect of the present invention provides a fuel adsorbent member holding an adsorbent material that adsorbs evaporative fuel. The fuel adsorbent member is arranged in an air cleaner at a position downstream from a pleated filter element. The fuel adsorbing member includes a holding piece received in a space between adjacent element pleats of the filter element. The holding piece maintains an interval between the adjacent element pleats.

Another aspect of the present invention provides an air cleaner having a pleated filter element. The air cleaner includes a fuel adsorbent member that holds an adsorbent material that adsorbs evaporative fuel. The fuel adsorbent member is arranged in the air cleaner at a position downstream from the filter element. The fuel adsorbent member has the holding piece that is received in a space between adjacent element pleats of the filter element and thereby maintains an interval between the element pleats.

DETAILED DESCRIPTION OF THE PREFERRED EMBODIMENTS

A first embodiment of the present invention will now be described with reference to FIGS. 1 to 3.

Figure 1:
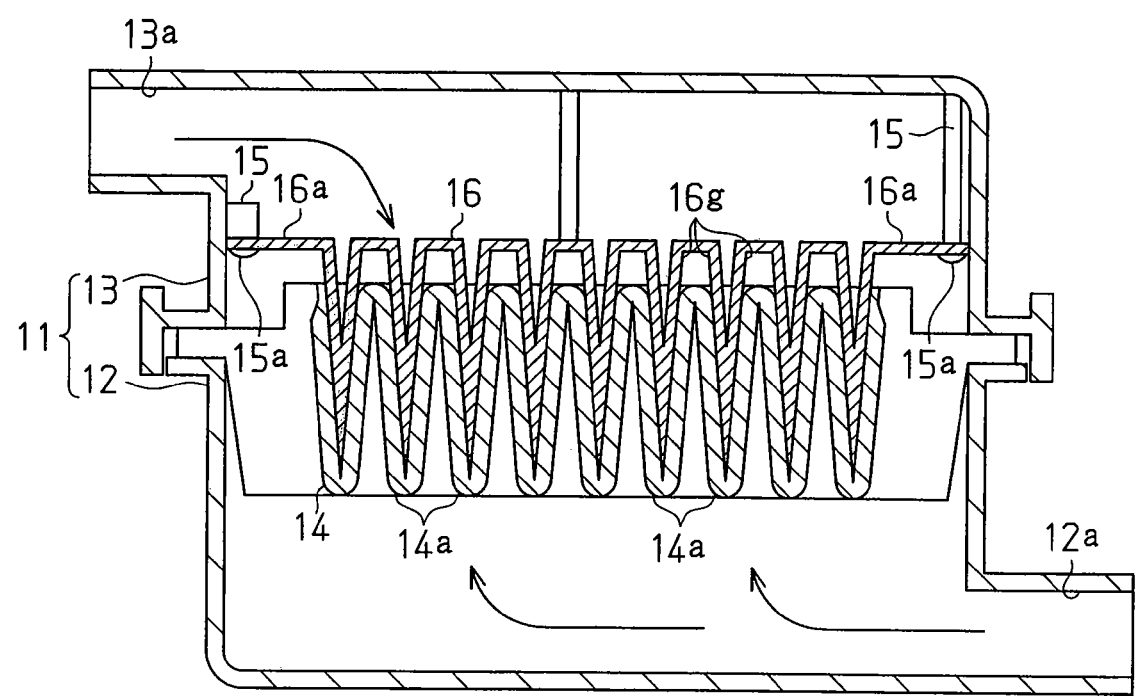
FIG. 1 is a longitudinal cross-sectional view showing an air cleaner according to a first embodiment of the present invention.
Figure 2:
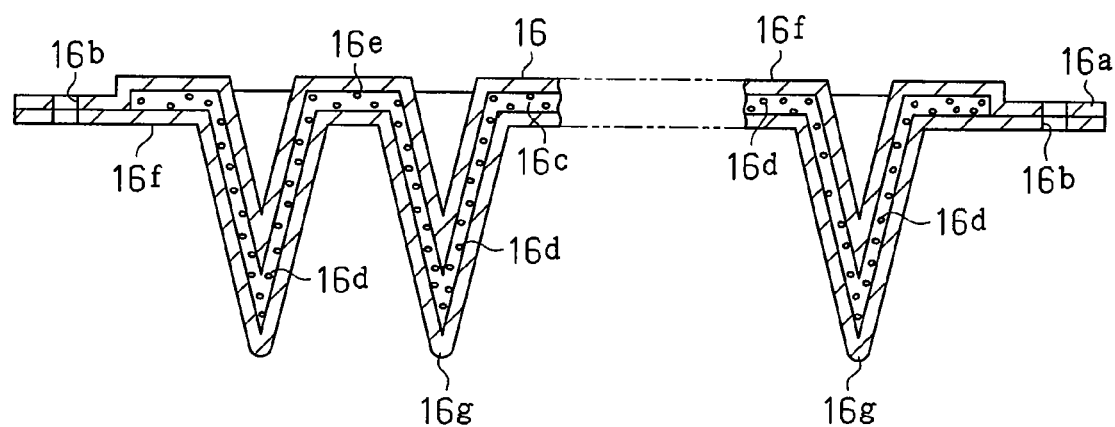
FIG. 2 is a cross-sectional view showing a portion of the fuel adsorbent member.
Figure 3:
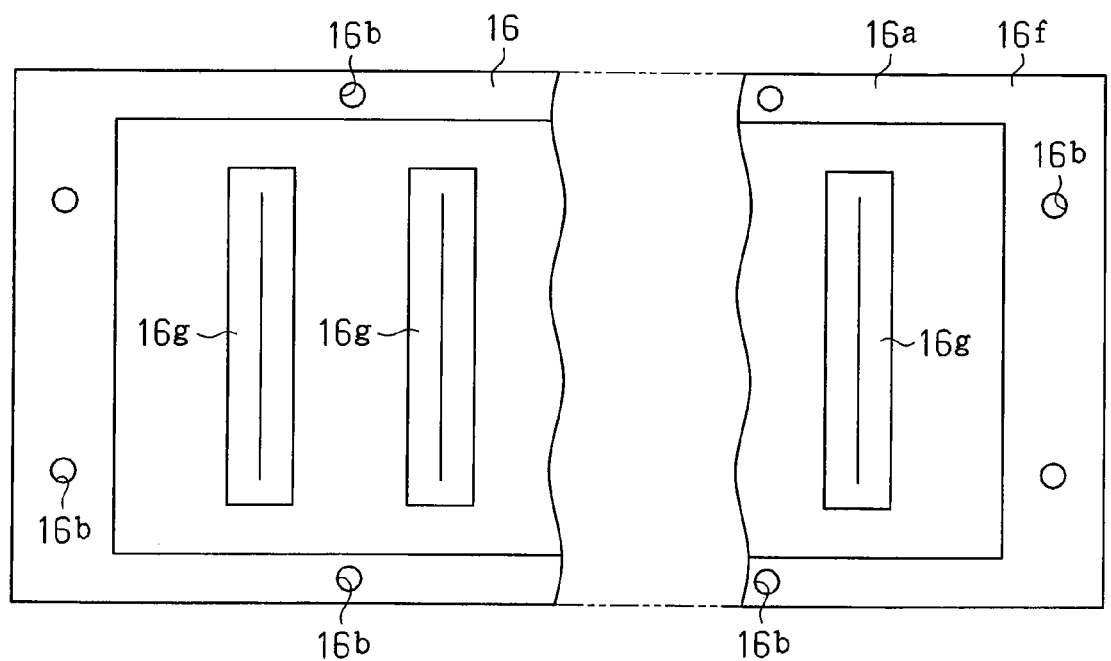
FIG. 3 is a bottom view showing the fuel adsorbent member.

As shown in FIGS. 1 and 2, an air cleaner has a housing 11 defined by a first housing member 12 and a second housing member 13. The first housing member 12 has an inlet port 12a. An opening is defined in an upper side of the first housing member 12. The second housing member 13 has an outlet port 13a. An opening is defined in a lower side of the second housing member 13. The first and second housing members 12, 13 are joined together with a clamp (not shown) with the openings of the first and second housing members 12, 13 opposed to each other.

A filter element 14 is arranged between the first housing member 12 and the second housing member 13 and in a pleated state. The filter element 14 filters intake air that is supplied through an intake system of an engine. The filter element 14 includes a number of pleats 14a and is arranged in a manner crossing an air passage extending from the inlet port 12a to the outlet port 13a. The filter element 14 is separably secured to the housing 11.

A plurality of projections 15 project from an inner wall of the second housing member 13 at positions downstream from the filter element 14. A pin 15a is provided in the distal end of each of the projections 15. A fuel adsorbent member 16 has a peripheral flange 16a and securing holes 16b are defined in the peripheral flange 16a (see FIG. 3). Each of the pins 15a is passed through the corresponding one of the securing holes 16b. The fuel adsorbent member 16 is secured to the projections 15 by thermally swaging the pins 15a to the corresponding securing holes 16b. The fuel adsorbent member 16 is permeable to the air and extends together with the filter element 14 in a manner crossing the air passage.

The fuel adsorbent member 16 has a holding sheet 16e and a pair of cover sheets 16f that cover opposing sides of the holding sheet 16e. The holding sheet 16e is formed of a non-woven sheet base 16c that holds granular adsorbent 16d formed of, for example, activated carbon. The cover sheets 16f are each formed of non-woven fabric. The granular adsorbent 16d of the fuel adsorbent member 16 adsorbs evaporative fuel leaking from the intake system of the engine. At least the cover sheet 16f that is located closer to the engine is formed of highly heat resistant fibers so that the cover sheet 16f can tolerate the heat generated by an engine backfire.

The portion of the fuel adsorbent member 16 except for the peripheral flange 16a, which opposes the filter element 14, is pleated. The lower surface of the fuel adsorbent member 16 thus includes a plurality of holding pleats 16g. Each of the holding pleats 16g projects toward an upstream side of the air passage. The holding pleats 16g are arranged at the pitch equal to the pitch of the element pleats 14a of the filter element 14. Each of the holding pleats 16g functions as the holding piece and is received in the space between an adjacent pair of the element pleats 14a of the filter element 14. This structure maintains a constant interval between the adjacent element pleats 14a of the filter element 14.

Operation of the air cleaner will hereafter be explained with reference to FIGS. 1 and 2.

Figure 7:
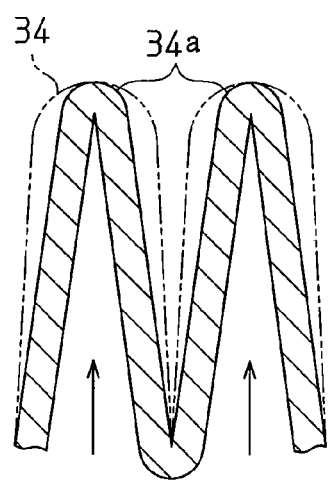
FIG. 7 is a cross-sectional view showing a portion of a prior-art filter element.

When the engine runs, air is supplied to the engine through the housing 11 of the air cleaner. The dust or the like is thus removed from the air by the filter element 14. At this stage, the pressure of the air acts to expand the element pleats 14a of the filter element 14. This brings each adjacent pair of the element pleats 14a into tight contact with each other as illustrated in FIG. 7, thus decreasing the air-permeability of the filter element 14. However, in the first embodiment, the holding pleats 16g of the fuel adsorbent member 16 are each arranged between an adjacent pair the element pleats 14a of the filter element 14. The interval between the adjacent pairs of the element pleats 14a is thus maintained constant. This prevents each adjacent pair of the element pleats 14a from contacting each other when receiving the intake air. The air-permeability of the filter element 14 is thus maintained, and decrease of the dust catching performance of the filter element 14 is suppressed.

Further, if evaporative fuel leaks from the intake system of the engine and is introduced into the housing 11 of the air cleaner, the fuel is adsorbed by the fuel adsorbent member 16. This suppresses release of evaporative fuel into the environment, which may lead to the air pollution.

In the case of an engine backfire, pressure produced by the backfire is introduced into the housing 11 through the outlet port 13a, thus pressing the fuel adsorbent member 16 against the filter element 14. However, in the first embodiment, the holding pleats 16g of the fuel adsorbent member 16 are each received in the space between an adjacent pair of the element pleats 14a of the filter element 14. This structure allows the filter element 14 to receive the pressure that acts to press the fuel adsorbent member 16 through the holding pleats 16g. The securing portion of the fuel adsorbent member 16 by which the fuel adsorbent member 16 is secured to the housing 11 is thus prevented from being damaged.

The first embodiment has the following advantages.

(1) The holding pleats 16g hold the corresponding element pleats 14a of the filter element 14 separately from the adjacent element pleats 14a. This maintains the air-permeability of the filter element 14 and thus the dust catching performance of the filter element 14.

(2) If an engine backfire occurs, pressure caused by the backfire is received by not only the fuel adsorbent member 16 but also the filter element 14 through the holding pleats 16g and the element pleats 14a. This prevents damages to the securing portion (the peripheral flange 16a) of the fuel adsorbent member 16 by which the fuel adsorbent member 16 is secured to the housing 11.

(3) The holding pleats 16g are formed by folding the fuel adsorbent member 16 in a pleated manner. This makes it unnecessary to provide the holding pleats 16g as separate components, thus simplifying the configuration of the fuel adsorbent member 16. Further, the surface area of the fuel adsorbent member 16 as a whole increases, and fuel adsorbing performance of the fuel adsorbent member 16 is improved.

(4) Each of the holding pleats 16g has a substantially wedge-like cross-sectional shape. That is, each holding pleat 16g is tapered toward the distal end of the holding pleat 16g. This allows smooth insertion of the holding pleat 16g into the space between the adjacent element pleats 14a of the filter element 14. Accordingly, after the filter element 14 is separated from the housing 11 for cleaning or replacement, the filter element 14 or a replacement of the filter element 14 can be easily re-secured to the housing 11.

A second embodiment of the present invention will hereafter be described with reference to FIGS. 4, 5, and 6. The description will omit detailed explanation of components of the second embodiment that are same as or like the corresponding components of the first embodiment.

Figure 4:
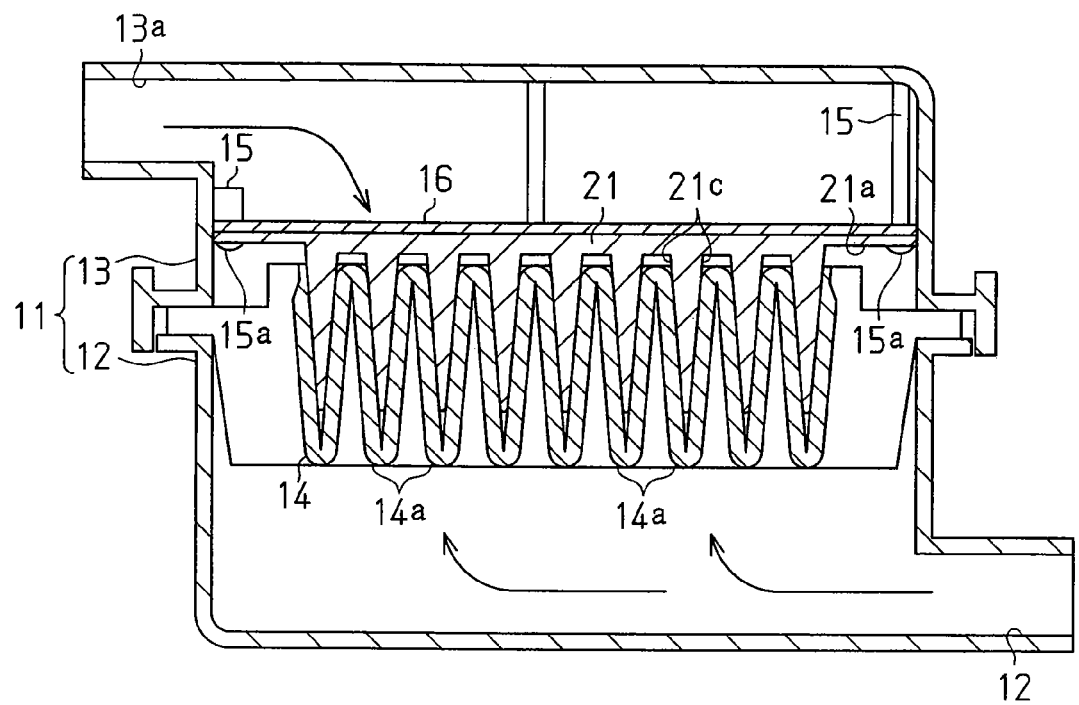
FIG. 4 is a longitudinal cross-sectional view showing an air cleaner according to a second embodiment of the present invention.
Figure 5:
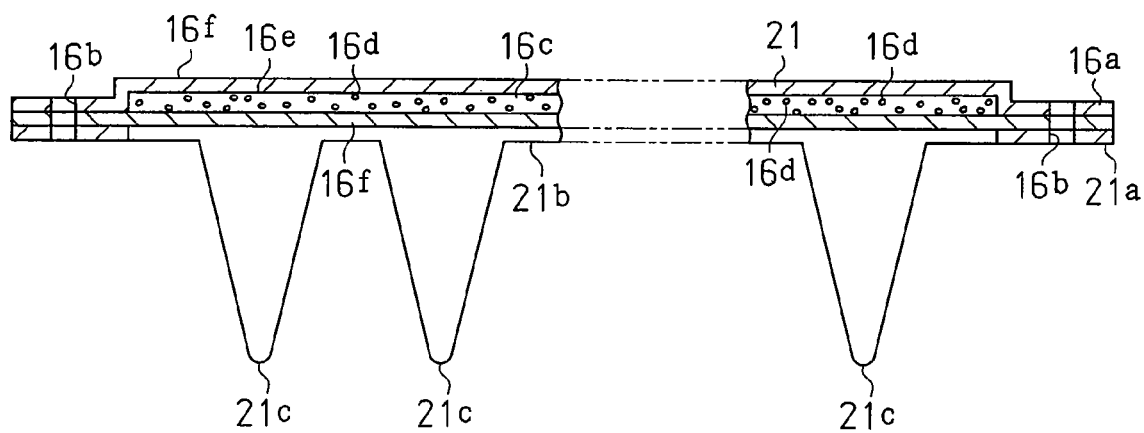
FIG. 5 is a cross-sectional view showing a portion of the fuel adsorbent member.
Figure 6:
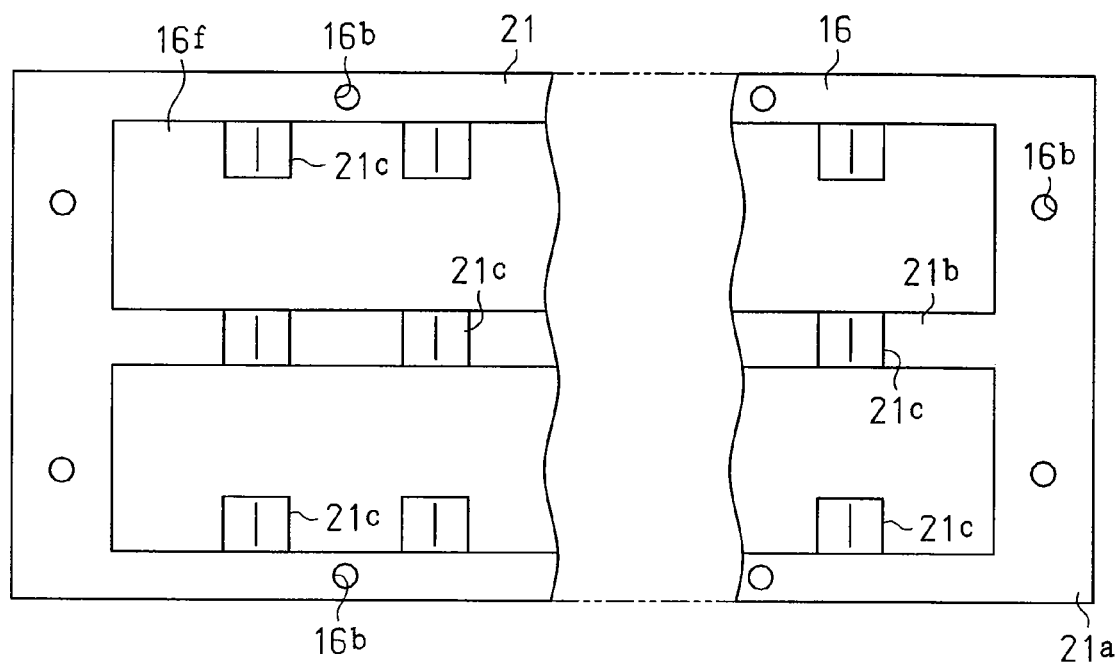
FIG. 6 is a bottom view showing the fuel adsorbent member.

As shown in FIGS. 4 to 6, a fuel adsorbent member 16 of the second embodiment is formed as a flat sheet. A frame member 21 formed of synthetic resin is arranged along the lower surface of a peripheral portion of the fuel adsorbent member 16. The frame member 21 is defined by an outer frame section 21a and an inner frame section 21b. The outer frame section 21a includes a pair of opposing portions that are connected together by the inner frame section 21b. The outer frame section 21a of the frame member 21 is bonded with the peripheral flange 16a of the fuel adsorbent member 16. A plurality of projections 21c project the lower surface of the outer frame section 21a and the lower surface of the inner frame section 21b. Each of the projections 21c has a wedge-like cross-sectional shape. The projections 21c are arranged at the pitch equal to the pitch of the element pleats 14a of the filter element 14. Each projection 21c functions as the holding piece and is received in the space between an adjacent pair of the element pleats 14a of the filter element 14. This maintains a constant interval between the adjacent element pleats 14a of the filter element 14.

The second embodiment has the following advantage.

(5) The frame member 21, which is an independent component, is secured to the fuel adsorbent member 16. The projections 21c of the frame member 21 are received in the spaces between the adjacent element pleats 14a of the filter element 14. Therefore, in the second embodiment, the conventional fuel adsorbent member 16, which includes the holding sheet 16e and the cover sheets 16f, can be used without any modification. Accordingly, the manufacturing procedure of the fuel adsorbent member 16 does not have to be greatly changed. This reduces the costs for manufacturing the fuel adsorbent member 16.

The illustrated embodiments may be modified as follows.

In each of the first and second embodiments, the adsorbent material held by the holding sheet 16e may be fibers containing activated carbon powder.

The inner frame section 21b may be omitted from the frame member 21 of the second embodiment.

The present examples and embodiments are to be considered as illustrative and not restrictive and the invention is not to be limited to the details given herein, but may be modified within the scope and equivalence of the appended claims.

The invention claimed is:

1. An air cleaner having a pleated filter element, comprising:
   a housing accommodating the filter element;
   a fuel adsorbent member arranged in the housing, wherein the fuel adsorbent member holds an adsorbent material that adsorbs evaporative fuel, wherein the fuel adsorbent member is formed as a flat sheet and is arranged in the air cleaner at a position downstream from the filter element;
   a frame member bonded with the peripheral portion of the fuel adsorbent member, wherein the frame member faces the filter element;
   wherein the frame member has a plurality of projections that is received in a space between adjacent element pleats of the filter element and thereby maintains an interval between the element pleats; and
   wherein the frame member is fixed to the housing with the peripheral portion of the fuel adsorbent member.

2. The air cleaner according to claim 1, wherein the fuel adsorbent member further comprises:
   a holding sheet that holds the adsorbent material; and
   a pair of cover sheets that cover opposing sides of the holding sheet.

3. The air cleaner according to claim 2, wherein the fuel adsorbent member adsorbs the evaporative fuel leaking from an engine.

4. The air cleaner according to claim 3, wherein the cover sheet that is located closer to the engine is formed of a heat-resistant fiber.

5. The air cleaner according to claim 1, wherein each of the projections has a substantially wedge-like cross-sectional shape.

6. The air cleaner according to claim 1, wherein the filter element is separably secured to the air cleaner.

7. The air cleaner according to claim 1, wherein the filter element and the fuel adsorbent member are arranged in a manner crossing an air passage defined in the air cleaner.

* * * * *